(12) United States Patent
Law

(10) Patent No.: US 8,086,870 B2
(45) Date of Patent: Dec. 27, 2011

(54) METHODS AND APPARATUS FOR HARDWARE NORMALIZATION AND DENORMALIZATION

(75) Inventor: Patrick Law, Milpitas, CA (US)

(73) Assignee: Broadcom Corporation, Irvine, CA (US)

(*) Notice: Subject to any disclaimer, the term of this patent is extended or adjusted under 35 U.S.C. 154(b) by 415 days.

(21) Appl. No.: 11/450,383

(22) Filed: Jun. 12, 2006

(65) Prior Publication Data

US 2007/0011467 A1 Jan. 11, 2007

Related U.S. Application Data

(63) Continuation of application No. 09/859,330, filed on May 16, 2001, now Pat. No. 7,062,657.

(60) Provisional application No. 60/235,190, filed on Sep. 25, 2000.

(51) Int. Cl.
*H04L 9/00* (2006.01)
(52) U.S. Cl. ........... 713/189; 713/192; 380/30; 708/205
(58) Field of Classification Search .................. None
See application file for complete search history.

(56) References Cited

U.S. PATENT DOCUMENTS

| | | | |
|---|---|---|---|
| 3,962,539 A | 6/1976 | Ehrsam et al. | |
| 4,779,220 A | 10/1988 | Nukiyama | |
| 5,058,048 A | 10/1991 | Gupta et al. | |
| 5,144,574 A | 9/1992 | Morita | |
| 5,267,186 A | 11/1993 | Gupta et al. | |
| 5,317,638 A | 5/1994 | Kao et al. | |
| 5,384,723 A | 1/1995 | Karim et al. | |
| 5,426,600 A | 6/1995 | Nakagawa et al. | |
| 5,459,681 A | 10/1995 | Harrison et al. | |
| 5,740,249 A | 4/1998 | Shimizu et al. | |
| 5,923,574 A | 7/1999 | Bechade | |
| 6,014,445 A * | 1/2000 | Kohda et al. | 380/28 |
| 6,028,939 A | 2/2000 | Yin | |
| 6,088,800 A | 7/2000 | Jones et al. | |
| 6,182,104 B1 | 1/2001 | Foster et al. | |
| 6,295,606 B1 | 9/2001 | Messerges et al. | |
| 6,356,636 B1 | 3/2002 | Foster et al. | |
| 6,704,871 B1 | 3/2004 | Kaplan et al. | |
| 7,062,657 B2 * | 6/2006 | Law | 713/189 |
| 2002/0106078 A1 | 8/2002 | Qi et al. | |
| 2002/0106080 A1 | 8/2002 | Qi et al. | |
| 2002/0108048 A1 | 8/2002 | Qi et al. | |

FOREIGN PATENT DOCUMENTS

EP 0 802 653 A2 10/1997

OTHER PUBLICATIONS

C. Madison and N. Doraswamy, "The ESP DES-CBC Cipher Algorithm With Explicit IV", Nov. 1998, RFC 2405, 10 pages.

(Continued)

*Primary Examiner* — Kaveh Abrishamkar
(74) *Attorney, Agent, or Firm* — Sterne, Kessler, Goldstein & Fox P.L.L.C.

(57) ABSTRACT

Methods and apparatus are provided for efficiently normalizing and denormalizing data for cryptography processing. The normalization and denormalization techniques can be applied in the context of a cryptography accelerator coupled with a processor. Hardware normalization techniques are applied to data prior to cryptography processing. Context circuitry tracks the shift amount used for normalization. After cryptography processing, the processed data is denormalized using the shift amount tracked by the context circuitry.

14 Claims, 7 Drawing Sheets

OTHER PUBLICATIONS

European Search Report for related EP application No. EP 01 30 8081 dated May 13, 2003.

European Search Report for App. No. EP 01 30 8060 and Communication from the European Patent Office dated Jan. 26, 2005.

Cetin Kaya Koc, "RSA Hardware Implementation", RSA Laboratories, RSA Data Security, Inc., Redwood City, California, Version 1, Aug. 1995, 28 pages.

Abstract for Japanese Publication No. 59217294, Dec. 7, 1984, 1 page.

* cited by examiner

US 8,086,870 B2

METHODS AND APPARATUS FOR HARDWARE NORMALIZATION AND DENORMALIZATION

CROSS REFERENCE TO RELATED APPLICATIONS

This application is a continuation of U.S. Non-Provisional application Ser. No. 09/859,330, filed May 16, 2001, which claims the benefit of U.S. Provisional Application No. 60/235,190, filed Sep. 25, 2000, all of which are incorporated herein by reference in its entirety.

BACKGROUND OF THE INVENTION

1. Field of the Invention

The present invention relates to normalization and denormalization of data. More specifically, the present invention relates to normalizing data for cryptography processing and denormalizing the processed output.

2. Description of the Prior Art

Various hardware implementations for cryptography processing typically use software configured external processors to both normalize and denormalize data associated with cryptographic processing. Many methods for performing cryptography processing are well known in the art and are discussed, for example, in Applied Cryptography, Bruce Schneier, John Wiley & Sons, Inc. (1996, 2nd Edition), incorporated by reference in its entirety for all purposes. In order to improve the speed of cryptography processing, specialized cryptography accelerators have been developed that typically out-perform similar software implementations. Examples of such cryptography accelerators include the Hi/fn™ 6500 and BCM™ 5805 manufactured by Broadcom, Inc. of San Jose, Calif.

Cryptography accelerators, such as the BCM™ 5805 and Hi/fn™ 6500 chips, typically use software configured external processors to provide normalized data or normalized numbers for cryptography processing. Generally, a floating point number having no leading zeros is referred to herein as a normalized number. For example, $1.0 \times 10^{-9}$ is in normalized floating point notation while $0.1 \times 10^{-8}$ is not. In binary notation, the binary number "10100010" is a normalized binary number while the binary number "01010001" is an unnormalized number. Typically, an unnormalized number is converted to a corresponding normalized number by, in the example of the binary numbers, performing a shift operation. Using the example from above, the unnormalized binary number "01010001" is shifted left by one bit to provide the normalized binary number "10100010" which is now in condition to undergo cryptography processing.

Generally, modifying the result of the cryptography processing by the previous shift amount provides a corresponding denormalized number. Again, using the examples from above, if the unnormalized binary number "01010001" is shifted left one bit to form the normalized binary number "10100010" and cryptography processing on the normalized binary number "10100010" yields a result dataword "11001100", then normalizing the result dataword "11001100" using the normalizing shift amount results in a "denormalized" result data word "01100110".

Unfortunately, however, conventional external processors (such as central processing units, or CPUs), are not optimized to handle the myriad of normalization and denormalization operations required for cryptography processing. For example, both the BCM 5805™ and Hi/fn™ 6500 are typically configured to process data blocks that are much larger than those data blocks that a central processing unit is optimized to handle.

Most encryption schemes (such as Diffie-Hellman, RSA, and DSA) commonly have data block sizes on the order of 512 to 1024 bits or sometimes larger. Typical central processing units, however, can only handle blocks of data of 32 or 64 bits at a time. As one skilled in the art would appreciate, in order to accommodate these large data blocks, the CPU consumes large amounts of valuable processing. Since software configuration requires copying large amounts of data to intermediate storage during normalization and denormalization, the 512 or 1024 bit data blocks would be read and copied 32 bits at a time to intermediate storage and subsequently reread and recopied onto an output.

The processing of data blocks of 512 or 1024 bit using software configured 32 bit or 64 bit architectures substantially reduces cryptography processing throughput and increases software complexity. Furthermore, software configurations are typically slow, cumbersome, and nontrivial.

It is therefore desirable to have a system, method, and apparatus that provides for efficient hardware normalization and denormalization suitable for high speed cryptography processing.

SUMMARY OF THE INVENTION

Methods and apparatus are provided for efficiently normalizing and denormalizing data for cryptography processing. The normalization and denormalization techniques can be applied in the context of a cryptography accelerator coupled with a processor. Hardware normalization techniques are applied to data prior to cryptography processing. Context circuitry tracks the shift amount used for normalization. After cryptography processing, the processed data is denormalized using the shift amount tracked by the context circuitry.

In one embodiment, a normalization/denormalization circuit included in a cryptography accelerator unit coupled to an external processor is provided. The circuit includes: a normalization sub-circuit arranged to generate normalized data based upon corresponding unnormalized data; a context sub-circuit coupled to the normalization circuit for characterizing the normalized data in relation to the unnormalized data; and a denormalization sub-circuit coupled to the context sub-circuit arranged to provide the unnormalized data based upon the normalized data and the characterization, wherein the normalization/denormalization circuit efficiently provides a normalization/denormalization service to the cryptography accelerator unit such that substantially no external processor resources are used to normalize or denormalize data.

According to one example, the data is written on-the-fly into the buffer in normalized form. A buffer can provide normalized data to data path circuitry having one or more carry save adders. The buffer can be a register file block. The data path circuitry can also use carry propagation techniques in conjunction with carry save computation. The shift amount tracked by the context circuitry can correspond with the number of zeros more significant than the leading one of the data.

In one embodiment, a normalization/denormalization circuit included in a cryptography accelerator unit coupled to an external processor is provided. The circuit includes: a normalization sub-circuit arranged to generate normalized data based upon corresponding unnormalized data; a context sub-circuit coupled to the normalization circuit for characterizing the normalized data in relation to the unnormalized data; and a denormalization sub-circuit coupled to the context sub-circuit arranged to provide the unnormalized data based upon the normalized data and the characterization, wherein the normalization/denormalization circuit efficiently provides a normalization/denormalization service to the cryptography accelerator unit such that substantially no external processor resources are used to normalize or denormalize data.

In another embodiment, a method for performing normalization/denormalization in a cryptography accelerator unit coupled to an external processor is provided. The method includes: generating normalized data corresponding to unnormalized data; characterizing the normalized data in relation to the unnormalized data; and providing unnormalized data based upon the normalized data and the characterization, wherein the normalization/denormalization circuit efficiently provides a normalization/denormalization service to the cryptography accelerator unit such that substantially no external processor resources are used to normalize or denormalize data.

These and other features and advantages of the present invention will be presented in more detail in the following specification of the invention and the accompanying figures which illustrate by way of example the principles of the invention.

BRIEF DESCRIPTION OF THE DRAWINGS

The invention may best be understood by reference to the following description taken in conjunction with the accompanying drawings.

DETAILED DESCRIPTION OF SPECIFIC EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Broadly speaking, the invention relates to a system, method, and apparatus for efficiently normalizing data provided to a cryptography accelerator as well as the denormalizing the processed data. In one embodiment, a cryptography accelerator coupled to a processor includes normalization circuitry for writing unnormalized data into a buffer in normalized form by shifting the data by a shift amount. Data path circuitry performs cryptography processing operations on the normalized data in the buffer. Denormalization circuitry coupled with the data path circuitry denormalizes the processed data using the shift amount.

The invention will now be described in terms of a cryptographic accelerator system that can be implemented in a number of ways, such as for example, as a stand alone integrated circuit, as embedded software, or as a subsystem included in, for example, a server computer used in a variety of Internet and Internet related activities. It should be noted, however, that the invention is not limited to the described embodiments and can be used in any system where high speed encryption is desired.

Figure 1:
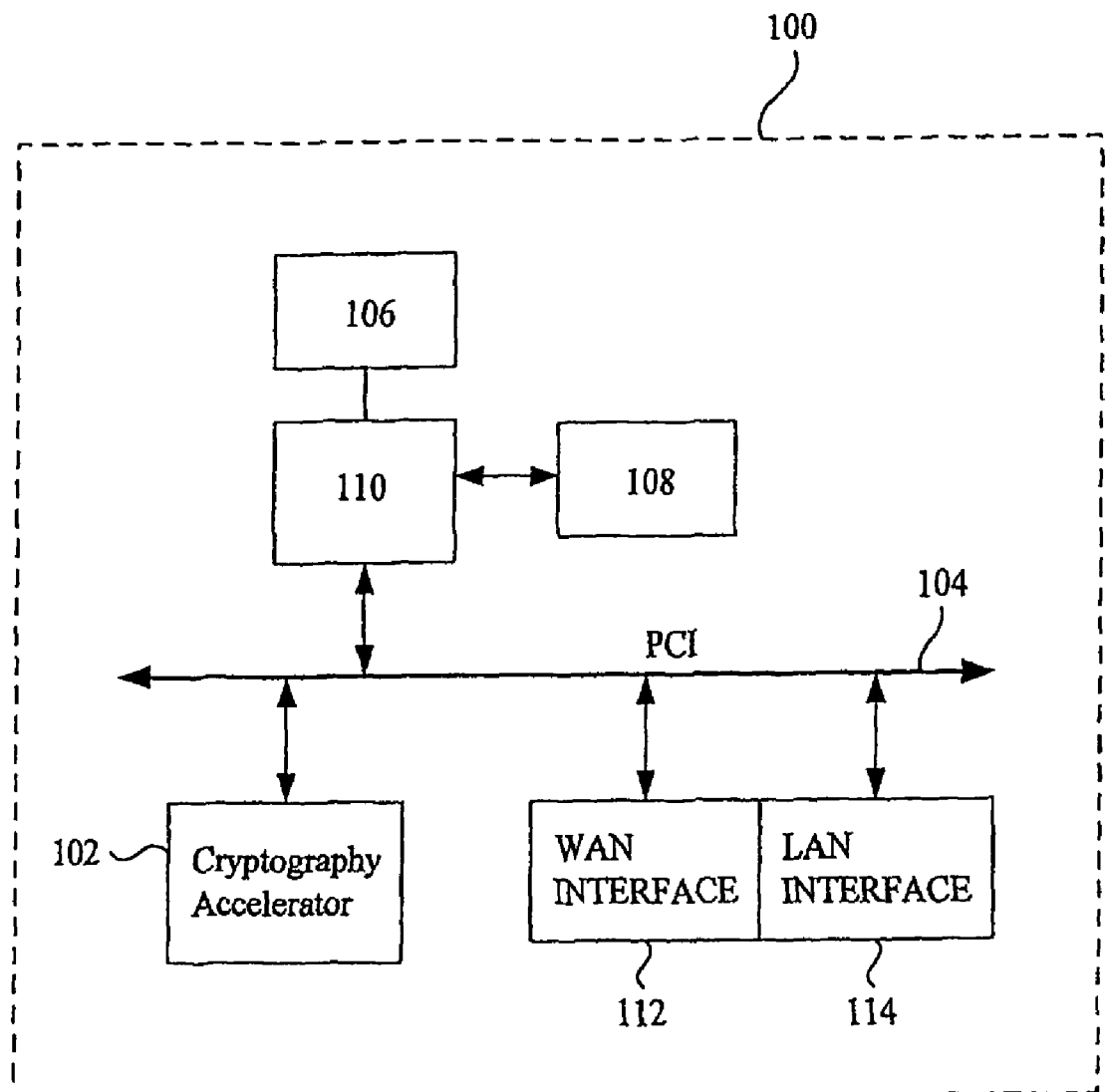
FIG. 1 is system level diagram that may use the present invention, according to specific embodiments.

FIG. 1 is a diagrammatic representation of one example of a cryptographic processing system 100 in accordance with an embodiment of the invention. As shown in FIG. 1, the present invention may be implemented in a stand-alone cryptography accelerator 102 or as part of the system 100. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110. Although the processing unit 106 may be the central processing unit or CPU of a system 100, it does not necessarily have to be the CPU. It can be one of a variety of processors. A LAN interface 114 couples the processing system 100 to a local area network (LAN) and receives packets for processing and writes out processed packets to the LAN (not shown). Likewise, a Wide Area Network (WAN) interface 112 connects the processing system to a WAN (not shown) such as the Internet, and manages in-bound and out-bound packets, providing automatic security processing for IP packets.

A cryptography accelerator 102 can perform many cryptography processing computations using what is referred to as long integer arithmetic. Long integer arithmetic performs operations numbers that can be hundreds of digits longs. For example, public key computations such as Diffie-Hellman, RSA, and DSA, have primitive operations that use long integer arithmetic on 1024-bit numbers. Hardware implementations use what is referred to as carry save representation to perform long integer arithmetic. Carry save format represents a number using uses two independent quantities or values called sum bits and carry bits. At the end of the operation, the sum bits and carry bits are added together using regular adders to convert the number back to binary form. In this way, carry save computation avoids carry propagation until the end of a sum of numbers as well as avoiding resource intensive carry propagation until the final step in an operation. Carry save computation and other topics relevant to the present invention are discussed in Computer Organization and Design, John Hennessy and David Patterson, Morgan Kaufmann Publishers (1998, 2nd Edition), the entirety of which is herein incorporated by reference for all purposes. In addition to using carry save adders, the present invention may use a variety of ripple adders, carry lookahead adders, and MSI adders.

Carry save representation, however, can require that data be normalized before computation and denormalized after computation. Still referring to FIG. 1, the processing unit 106 normalizes data prior to sending the data packet to the bus 104 by way of the bridge 110 for cryptography accelerator 102. As one of skill in the art will appreciate, many cryptography processing operations are based on $y=g^x \mod(n)$. Each of the values g, x, and n are typically supplied in normalized form to prior art cyptography processors. Many variations of $y=g^x \mod(n)$ exist such as $y=g^x\mod(n)\mod(m)$.

Figure 2:
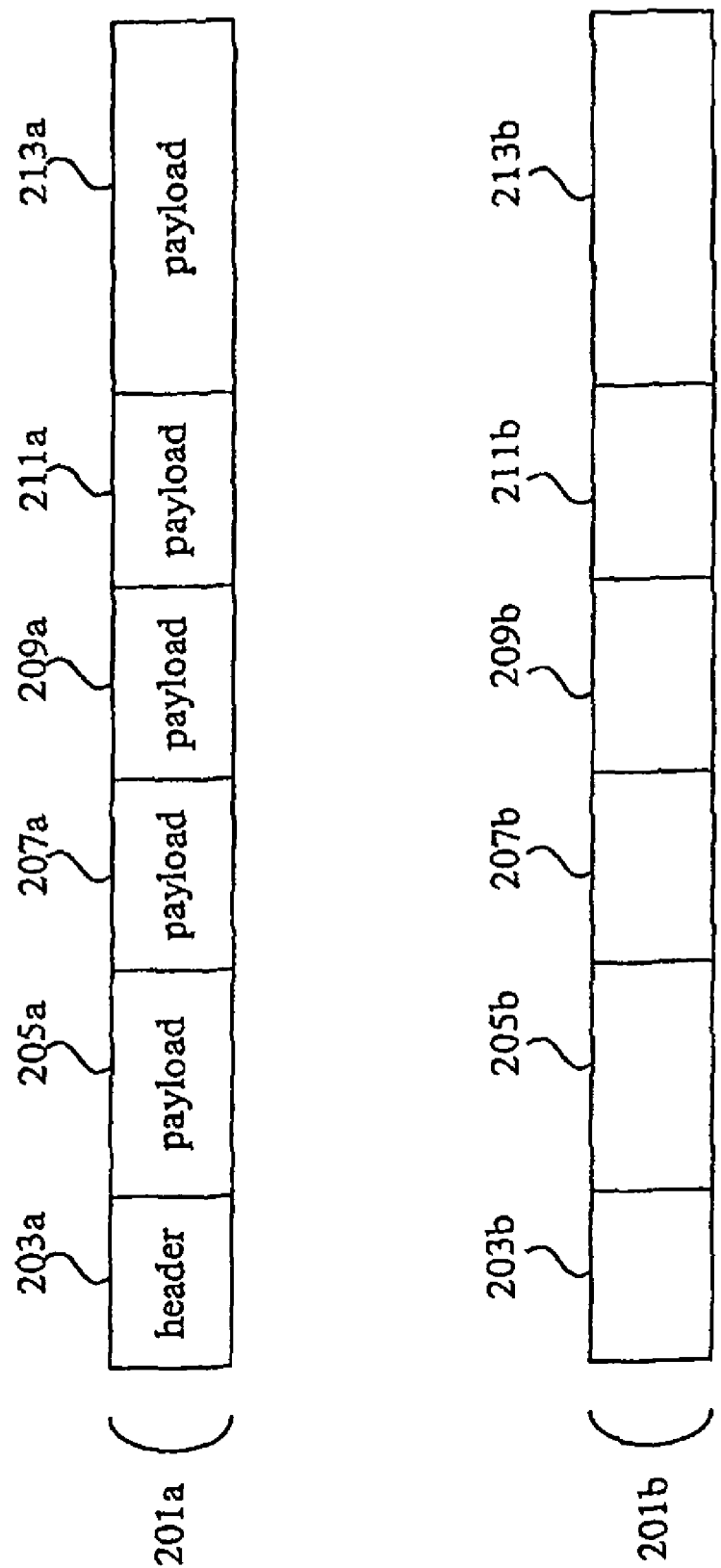
FIG. 2 is a diagrammatic representation of a packet that can be transmitted from a processor to a cryptography acceleration chip, according to specific embodiments.

FIG. 2 shows a packet that can be used by the processing unit 106 to transmit g, x, and n along with other data to cryptography the cryptography accelerator 102. Packet 201a can contain header 203a along with payload comprising 205a, 207a, 209a, 211a, and 213a. In the packet shown in FIG. 2, the header 203a contains address and length information, the block 205a contains the normalized form of g, the block 207a contains the normalized form of x, and the block 209a contains the normalized form of n. In the example shown, each block size is a multiple of 32 bits and n is 1024 bits in length. Other data can be provided as well in blocks 211a and 213a.

According to the present invention, the processing unit 106 does not normalize the data g, x, and n prior to transmitting packet 201b to cryptography accelerator 102. Block 205b can contain g, block 207b can contain x, and block 209b can contain n. Each block size again can be a multiple of 32 bits and n can be 1028 bits. The processor 106 can provide the positions of the leading ones in each of blocks 205b, 207b, and 209b so that the cryptography accelerator 102 can more easily normalize the data. The leading one is the most significant one in a string of bits. For example, in the string 0101, the leading one would be the second digit from the left. As will be appreciated by one of skill in the art, other information can be provided by the processor 106 to cryptography accelerator 102. For example, the length of each block can also be provided.

Figure 3:
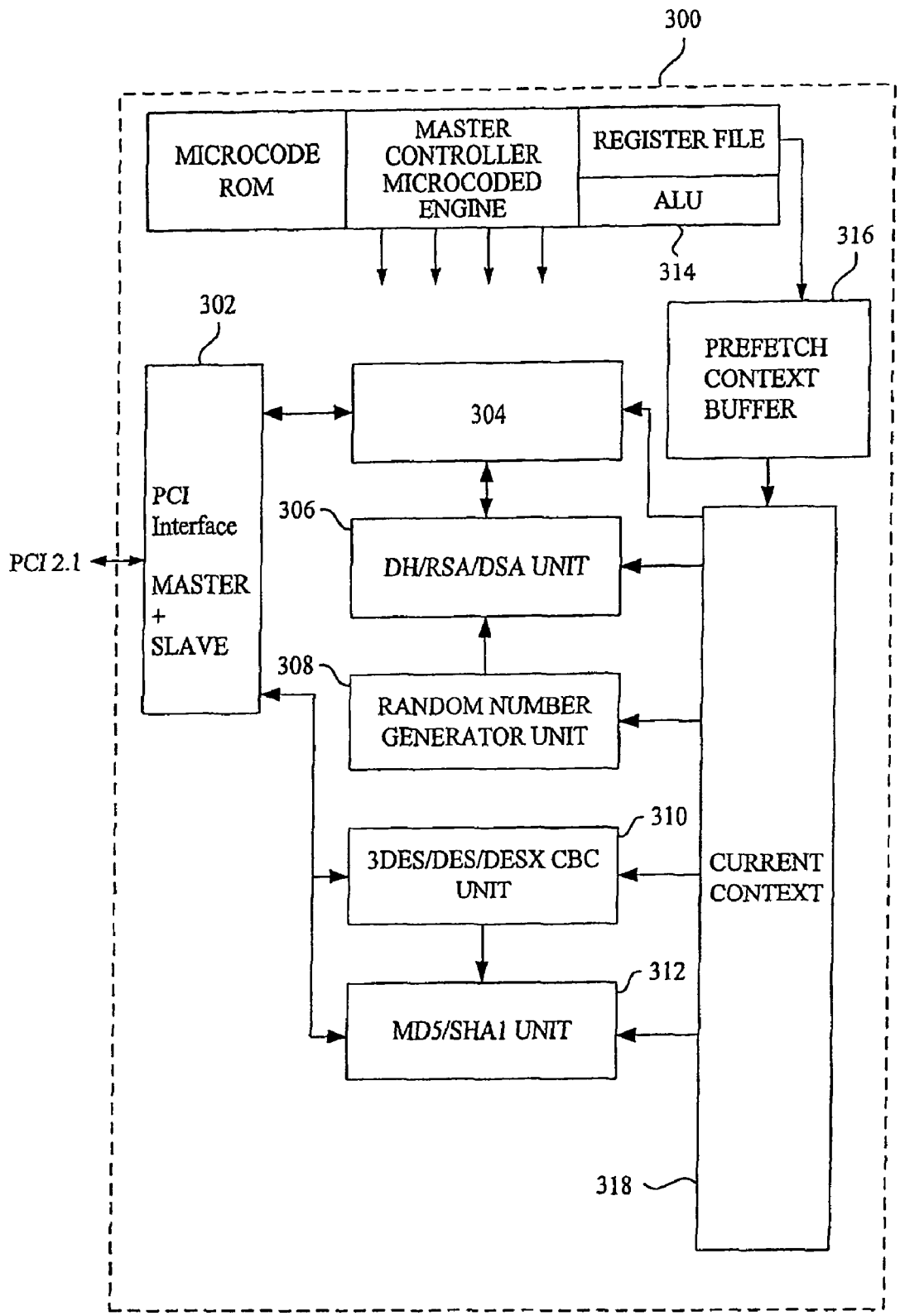
FIG. 3 is a diagrammatic representation showing a cryptography acceleration chip that may use the present invention, according to specific embodiments.

FIG. 3 is a diagrammatic representation of one embodiment of a cryptography accelerator 102 that can receive the packet 201b containing data that has not yet been normalized. A cryptography accelerator 102 interfaces with components described in FIG. 1 through an interface such as a PCI interface 302.

According to various embodiments, a normalization and denormalization system 304 is coupled with the bus interface 302 to receive data that has not yet been normalized. The normalization and denormalization system 304 is used to receive data from packet 201b for public key processing. The components in packet 201b are normalized prior to cryptography processing and denormalized after cryptography processing using the register files. The register files and other components in the normalization and denormalization system 304 system will be described further below with reference to FIGS. 4-6.

In the described embodiment, the cryptography accelerator 102 can include a key setup execution unit such as a DH(Diffie-Hellman)/RSA/DSA unit 306 and a random number generator unit 308 to facilitate the public key processing. It is a well established fact that a hardware random number generator 308 is better able to produce numbers in a more random fashion than is a software random number generator. The key setup execution unit 306 accelerates the public key operations and the random number generator unit 308 generates secure private keys. A number of both public-key and private-key operations can be performed in parallel. Although not shown in FIG. 3, the cryptography accelerator 102 can include buffers along with the various other components. The buffers can be used to handle the long latency periods during public-key and private-key operations. Other components can be used for context and data handling. In one embodiment, RSA private key operations are performed in parallel on the same chip.

The cryptography accelerator 102 can also use cell based processing as described in co-pending U.S. application Ser. No. 09/510,486, entitled "Security Chip Architecture And Implementations For Cryptography Acceleration" at the time of filing on Feb. 23, 2000, the entirety of which is hereby incorporated by reference for all purposes. Context information needed to process the current packet is read in and stored in the pre-fetch context buffer 316. The cryptography accelerator 102 can include cryptography engines 310 and 312 along with other engines. In one embodiment, the cryptography engine 310 is a "3DES-CBC" unit 310 that provides encryption and decryption of incoming packets and the cryptography engine 312 is a "MD5/SHA1" unit 312 that provides authentication and digital signature processing. It should be note that in addition to the cryptography units shown, any other current or future algorithms may be supported in the cryptography accelerator 102. For in-bound packets received from an outside source such as another computer or an external network, the cells can be first authenticated and then decrypted in parallel fashion. For out-bound packets destined for an outside source, the cells can be first encrypted then authenticated, again in pipelined fashion. The sequencing of the data processing and pre-fetching is controlled by a microcontroller 314, and the program code ensures that the cryptography engines are continually provided with cells and context information.

The cryptography accelerator 102 can also contain additional components for normalization and denormalization. For example, an arithmetic logic block can be coupled to the normalization and denormalization system for cryptography processing. Alternatively, specific arithmetic logic units can be integrated into the normalization and denormalization system 304.

Figure 4:
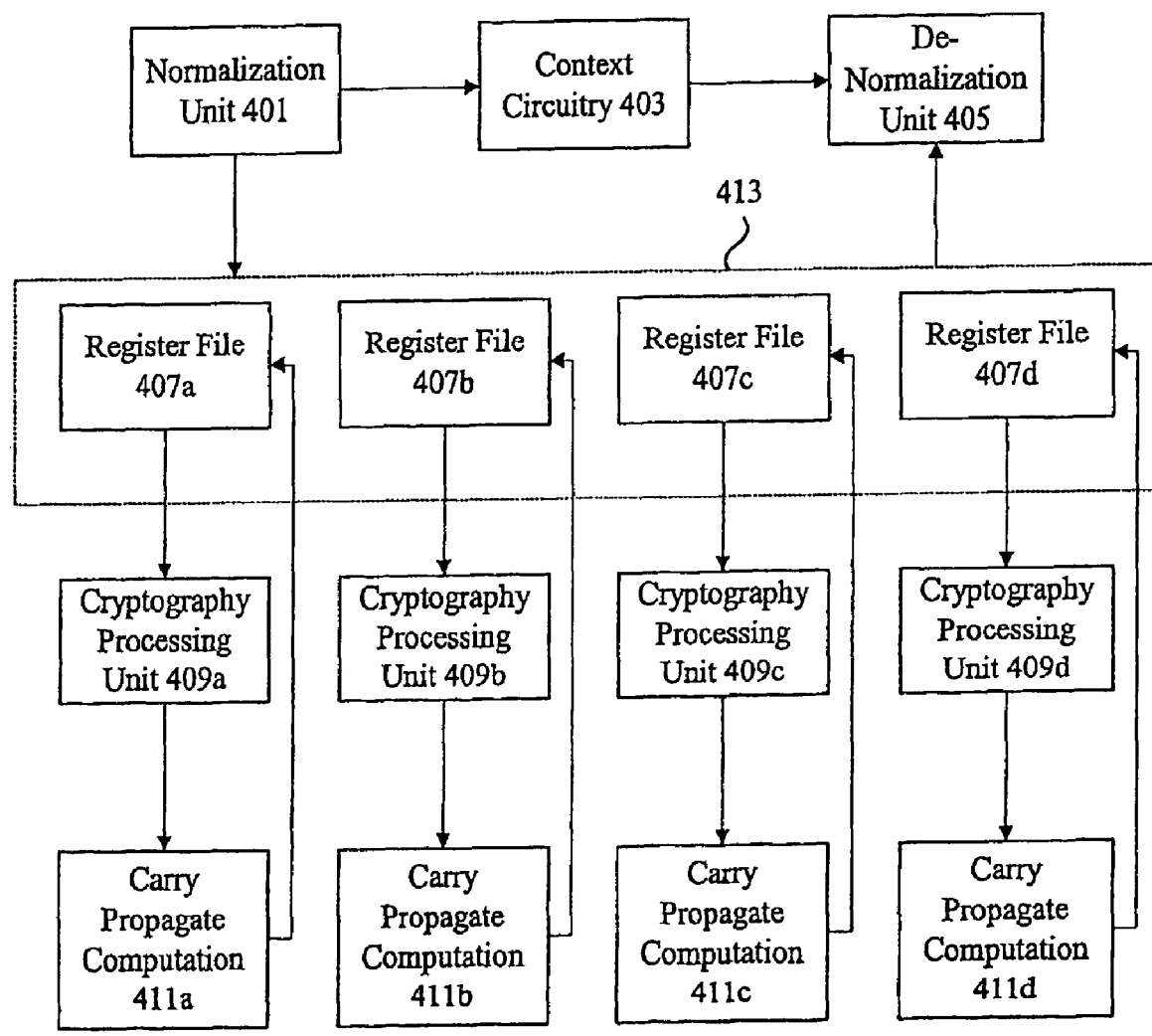
FIG. 4 is a diagrammatic representation diagram depicting cryptography processing data path having hardware normalization and denormalization, according to specific embodiments.

FIG. 4 describes one embodiment of a normalization and denormalization 304 system having integrated arithmetic logic units in accordance with an embodiment of the invention. The normalization and denormalization system 304 includes normalization unit 401 for normalizing data. As noted above, normalizing data typically comprises shifting bits so that a leading one becomes the most significant bit. For example, an unnormalized data word D1 "00101111" after normalization becomes a normalized data word $D1_n$ "10111100" where context circuitry 403 tracks the shift amount. In the example, the unnormalized data word D1 "00101111" is normalized to the normalized data word $D1_n$ "10111100." The corresponding shift amount is two bits. Bits can be shifted using conventional barrel shifters or bits can be shifted on the fly as data is written from the data packet to the buffer 413. In one example, the buffer contains register files 407. The register files 407 can comprise four 1028 bit blocks.

According to various embodiments, the shift amount is provided in data packet 201b. In one example, data can be written to register files 407 in normalized form. The shift amount is tracked using context circuitry 403. The normalized data is processed by cryptography processing unit 409. According to various embodiments, multiple cryptography processing units can be used with a single normalization unit 401 and a single denormalization unit 405. Cryptography processing unit 409 can use carry save computation. As noted above, carry save computation defers carry propagation until the final step. After data is processed by cryptography processing unit 409, regular adders can be used for carry propagate computation at 411. The resulting data can be written to register files 407. The denormalization unit 405 uses the shift amount stored in context circuitry 403 and denormalizes the data in the register files 407.

Figure 5:
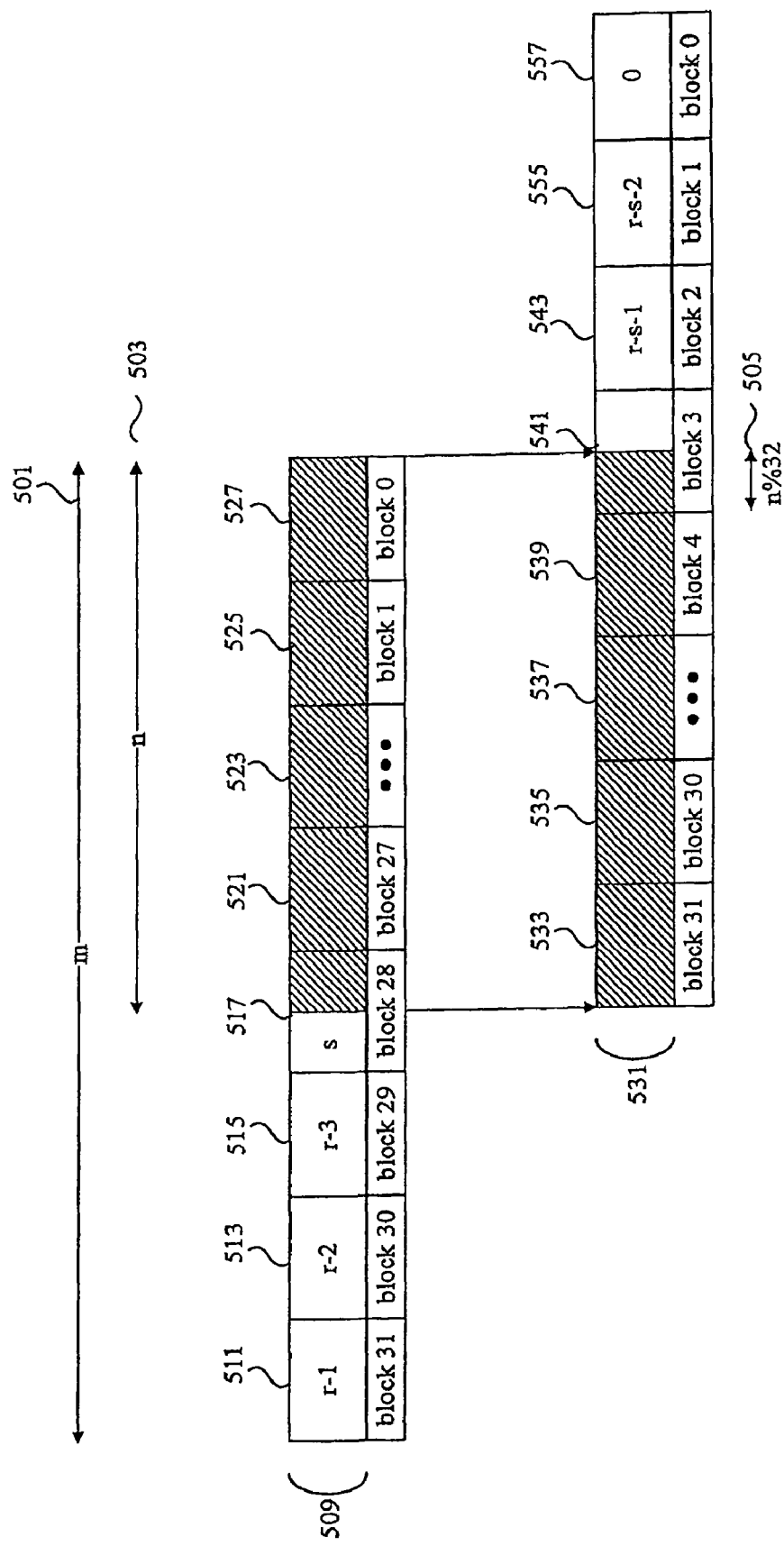
FIG. 5 is a diagrammatic representation showing hardware normalization and denormalization using data packets and registers, according to specific embodiments.

FIG. 5 is a diagrammatic representation of normalizing data from a data such as a data packet to register files 407 in accordance with an embodiment of the invention. Data 509 may be provided to the cryptography accelerator by the central processing unit 106 or some other processor in a packet such as the packet shown in FIG. 2. According to various embodiments, the length of data 509 is M which is typically 1024 bits. The length of data beginning from the leading one to the least significant bit is N. The blocks 511, 513, 515, 517, 521, 523, 525 and 527 can be 32 bits in length. It should be noted that block 523 can represent multiple blocks. Blocks 533, 535, 537, 539, 541, 543, 555, and 557 in register file 531 are also 32 bits in length. Similarly, blocks 537 can represent multiple blocks. The data 501 and the register file 531 can both comprise 32 blocks. Blocks 527 and 557 containing the least significant bits of data 509 and register file 531 are herein referred to as the least significant blocks or block 0. Similarly, blocks 511 and 533 containing the most significant bits of data 509 and register file 531 are herein referred to as the most significant blocks or block 31.

Both M 501 and N 503 can be provided in the data packet 201b received by the cryptography accelerator. According to one embodiment, blocks 511, 513, and 515 all contain zeros while 517 contains 16 zero bits. In other words, blocks 28-31 all contain zeros. The bits following the leading one in block 28 through block 0 in data 509 are written to block 31 through block 3 in register file 531. The zeros contained in block 31 through block 28 in data 509 are written to blocks 3 through block 0 in register file 531.

According to various embodiments, data 509 is written to register file 531 "on the fly." As a block of bits are read from data 509, a block of bits are written to register file 531. The following pseudo code implemented in hardware can perform normalization "on-the-fly" by reading and writing blocks of bits:

```
r = m/32;
s = n/32;
shf= n % 32;
if(shf != 0) {
    din_d = 0;
    for ( i = 0; i < 32; i++) {
        addr = (r - s - 1 + i ) % 32;
        din = next_word( );
        data = din << 32 | din_d;
        data = (data >> shf) & 0xffffffff;
        write_register (addr, data);
        din_d = din;
    }
}
else
    for (i = 0; i < 32; i++) {
        addr = (r - s + i) % 32;
        data = next_word( );
        write_register (addr, data);
    }
```

Figure 6:
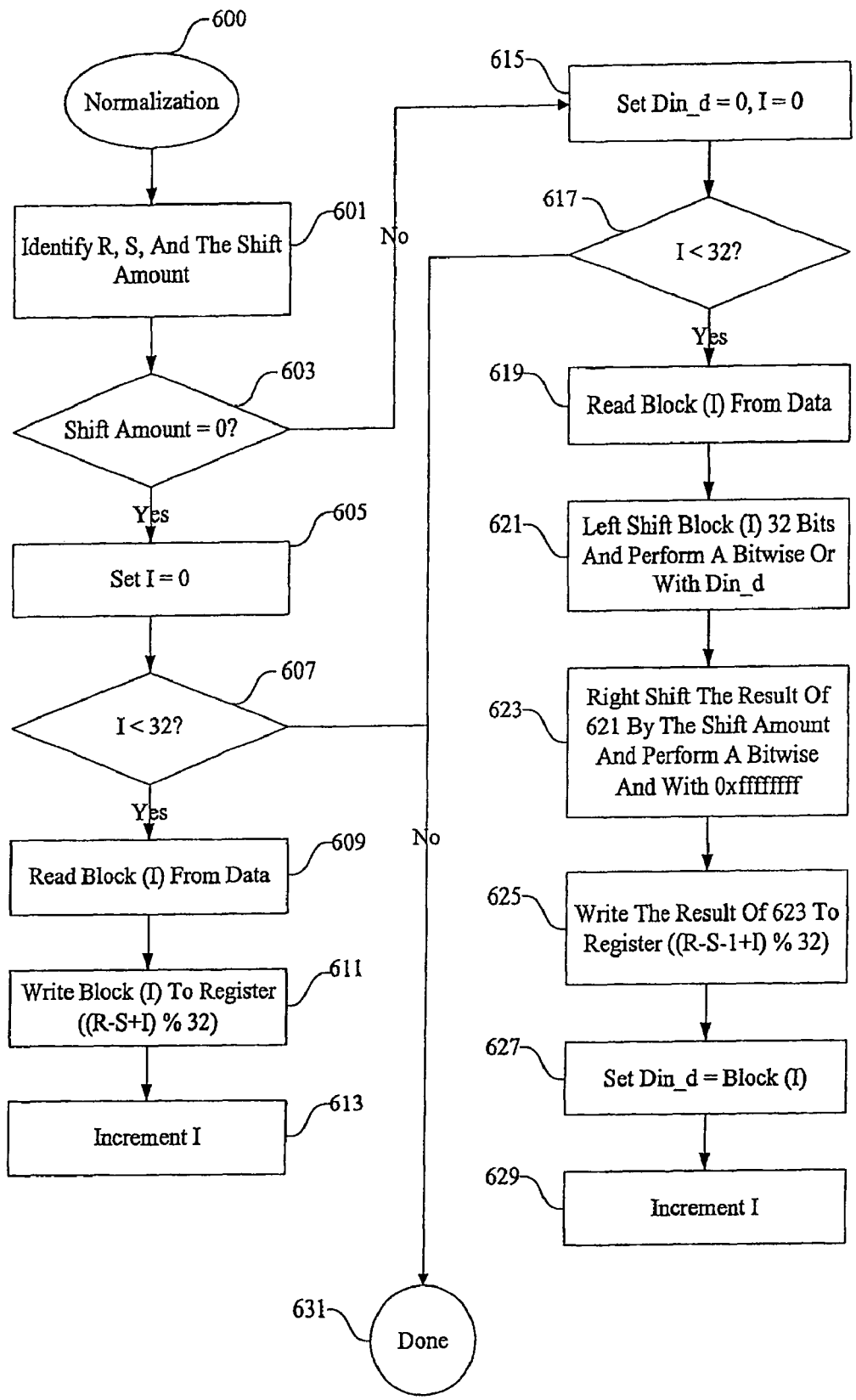
FIG. 6 is a flow diagram detailing the normalization process implemented in hardware, according to specific embodiments.

FIG. 6 is a flow diagram implemented in hardware describing aspects of the pseudo code for normalizing data, according to various embodiments. FIG. 6 will be described with reference to FIG. 5 and the pseudo code. The normalization process 600 begins by identifying R, S, and the shift amount. R is equal to the length of the data M 501 divided by the number of bits per data block. In other words, R is equal M divided by 32. S is equal to the number of bits N 503 divided by the number of bits per data block. In other words, S is equal to N divided by 32. The shift amount 505 is the modulus of N and 32. According to various embodiments, R, S, and the shift amount may be provided to the cryptography accelerator by another processor, such as a central processing unit.

At 603, if the shift amount is zero, blocks of bits from data 509 can be written as blocks of data to 531 without shifting bits within each block. If the shift amount is zero, a counter I is set to 0 at 605. If I is less than 32 representing the number of blocks in data 509, block I is read from data 609. Block I is then written to register file ((R−S+I)%32) at 611. I is then incremented by 1 at 613 and the process continues at 607. For example, when I is 0, and R and S are 32 and 29 respectively, data 509 has 29 blocks of data following the leading one and three blocks of data preceding the leading one. When I is 0, block 0 of data 509 is written to block 3 of register file 531, since (32−29+0)%32) is equal to 3. When I is incremented by 1 at 613, block 1 from data 509 is read and written to block 4 of register file 531, since (32−29+1)%32) is equal to 4. The process continues until block 31 is read from data 509 and written to block 2, since ((32−29+31)%32) is equal to 2. The blocks of register file 531 are written starting at block 3 through block 31 and subsequently from block 0 through block 2, according to specific embodiments.

The normalization of data proceeds similarly even when the shift amount is not zero at 603. At 615, a value Din_d and I are both set to 0. While I is less than 32 at 617, block I is read from data 509. The data in block I is left shifted 32 bits and a bitwise OR is performed with the contents of Din_d at 621. The result of 621 is then right shifted by the shift amount and a bitwise AND is performed with 0xffffffff at 623.

For example, in a system with 8 bit blocks sizes, a shift amount of 4, I=0, and block 0 containing 1001 0011, Din_d would initially contain 0000 0000. Shifting block 0 a total of 8 bits to the left and performing a bitwise OR would yield 1001 0011 0000 0000. Right shifting the result 1001 0011 0000 0000 by the shift amount of 4 bits would yield 1001 0011 0000. Performing a bitwise AND with the number 0xff or 1111 1111 would yield 0011 0000.

The result at 623 is then written to register file block 28, since ((32−29−1+0)%32) is 28. Din_d gets the value of block 0 at 627 and I is incremented by 1 at 629. Returning to the above noted 8 bit example, I is now 1. Block 1 is read from data 509 and is found to contain 1010 0101. Shifting block 1 a total of 8 bits to the left would yield 1010 0101 0000 0000. The value of Din_d was the value of block 0, 1001 0011. Performing a bitwise OR on shifted block 1 and Din_d would yield 1010 0101 1001 0011. Right shifting by the shift amount of 4 would yield 1010 0101 1001 and performing a bitwise AND operation with 0xff or 1111 1111 would yield 0101 1001. The result at 623 is then written to register file block 29, since ((32−29−1+1)%32) is 29. The process continues until I is equal to 32 and all blocks of data 509 have been read and written to register file blocks 513.

The above noted pseudo code and FIG. 6 describes normalization for 32 bit blocks. However, the techniques of the present invention can easily be adapted to handle various embodiments including systems using different size blocks. As will be appreciated by one of skill in the art, a variety of implementations can also be used to perform the techniques of the present invention. For example, the condition where the shift amount is equal to 0 does not need to be checked, since the condition can be handled using the same bit shifting technique described for shift amounts not equal to zero.

As will be appreciated by one of skill in the art, a process for hardware denormalization is similar to the techniques described for hardware normalization. The normalization techniques of the present invention described with reference to FIG. 6, FIG. 5, and the pseudo code can be adapted for use as denormalization techniques. Context circuitry can track the shift amount for a denormalization process to convert data in register files back into denormalized form.

Figure 7:
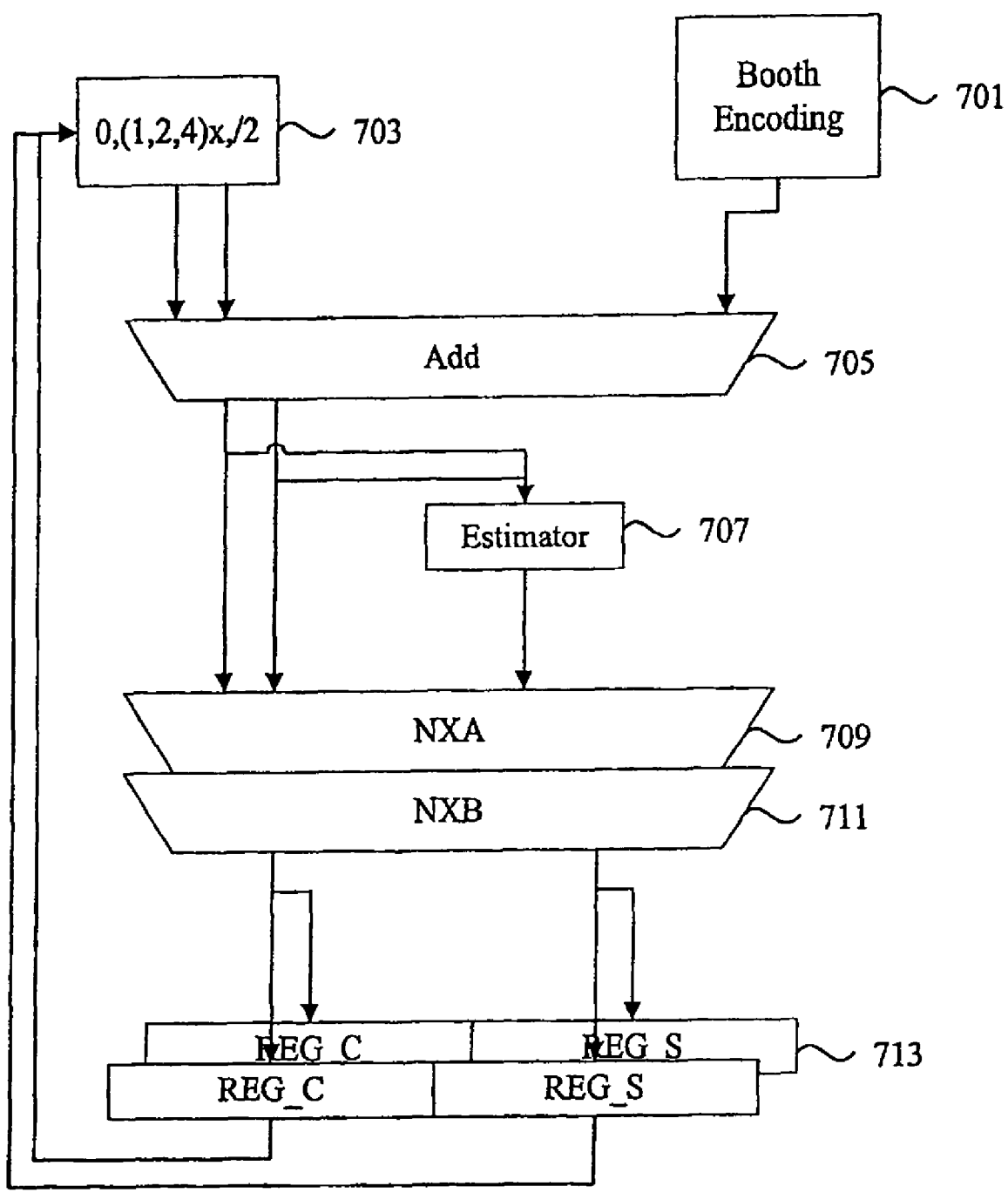
FIG. 7 is a flow diagram depicting a cryptography processing data path that can be used with the present invention, according to specific embodiments.

As noted above, data is normalized prior to processing in a cryptography processing unit 409 shown in FIG. 4 and denormalized after processing. FIG. 7 shows one example of a cryptography processing unit. As will be appreciated by one of skill in the art, a fundamental cryptography computation step is P=A*B mod N. According to various embodiments, it can be difficult to multiply two 1024 bit numbers, perform carry propagation, and then take a modulus. Instead, the fundamental cryptography computation step can be separated into iterations of the following:

$$P'=4*P+A*\text{Booth}(B); \text{ and}$$

$$P''=P'-\text{estimate}(k)*N.$$

According to various embodiments, the data path of FIG. 7 shows one example of a system for performing computation of P. Booth encoding block 701 multiplies A by Booth encoded B. The number of partial products needed for performing multiplication is reduced by half when Booth encoding block 701 is used. The time required for multiplication using Booth encoding is substantially less than the time required for typical multiplication schemes. Booth encoding is described in Computer Organization and Design, John Hennessy and David Patterson, Morgan Kaufmann Publishers (1998, 2nd Edition) which is incorporated by reference for all purposes in its entirety.

Block 703 represents a bit shifter that allows multiplication and division by factors of 2. Block 703 can perform 4*P as well as division by 2. As will be appreciated by one skilled in the art, left shifting the bits in a binary number by one bit is equivalent to a multiplication by two. Left shifting by two bits is equivalent to multiplication by four. Similarly, right shifting by one bit is equivalent to division by two. The 4*P represented by block 703 and the A* Booth(B) represented by block 701 are summed using adder 705. According to various embodiments, estimator 707 looks at the 11 most significant bits of a data block to form an estimation of an adjustment factor. The estimator is described in RSA Hardware Implementation, Cetin Kaya Koc, TR 801, RSA Laboratories, 30 pages, April 1996, the entirety of which is incorporated by reference for all purposes. The estimate(k) and N are provided along with p' to carry save adders 709 and 711. As noted above, carry save adders can defer carry propagation until the final step. Carry save adders use carry bits and sum bits stored in carry bit and sum bit registers 713 also referred to as carry save accumulators. The result can then be passed back to block 703 for multiplication by shifting.

As noted above, the data path described in FIG. 7 can precede a carry propagation block for adding the carry bits and the sum bits using conventional adders. The result from the carry propagation block can then be denormalized by a denormalization unit using context circuitry as described in FIG. 4. It should also be noted that many elements shown in FIG. 7 are optional, or can be replaced with comparable components. For example, the Booth encoding block can be replaced by shifters and adders.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. Therefore, the scope of the invention should be determined with reference to the appended claims.

What is claimed is:

1. A method for improving the efficiency of a hardware-based cryptographic accelerator, comprising:
   receiving in the hardware-based cryptographic accelerator an unnormalized data block containing unnormalized data, wherein the unnormalized data block has a first number of sub-blocks, wherein the most significant bit in the unnormalized data is a zero;
   mapping the bits in the unnormalized data block to a normalized data block having a second number of sub-blocks such that a leading one in the unnormalized data is located at a most significant bit position in the normalized data block, wherein the mapping includes:
      writing data in the unnormalized data block into the normalized data block in an unnormalized sub-block by unnormalized sub-block basis, starting with a least significant sub-block, wherein a least significant bit in the least significant sub-block of the unnormalized data block is written to an Xth position within an Nth sub-block of the normalized data block, wherein the Xth position is determined based on a number of bits following the leading one in a sub-block of the unnormalized data containing the leading one;
   storing data identifying a bit position of the leading one in the unnormalized data; and
   performing cryptographic processing on the normalized data block to generate a normalized processed block.

2. The method of claim 1, further comprising:
   determining N according to (R-S-1) mod B, wherein R is the length of the unnormalized data divided by a number of bits per unnormalized sub-block, S is a length of data in the unnormalized data from the leading one bit to the least significant bit divided by the number of bits per unnormalized sub-block, and B is the number of bits per unnormalized sub-block.

3. The method of claim 1, wherein the first number of sub-blocks in the unnormalized data block is the same as the second number of sub-blocks in the normalized data block.

4. The method of claim 2, wherein the number of bits in an unnormalized sub-block is the same as a number of bits in a normalized sub-block.

5. The method of claim 1, further comprising:
   unnormalizing the normalized processed block using the data identifying the bit position of the leading one in the unnormalized data to generate unnormalized processed data.

6. The method of claim 1, further comprising prior to writing:
   determining a shift amount; and
   for each unnormalized sub-block being written, shifting data in the unnormalized sub-block by the shift amount.

7. The method of claim 6, wherein the shift amount is determined according to M mod B, wherein M is a length of data in the unnormalized data from the leading one bit to the least significant bit and B is a number of bits per unnormalized sub-block.

8. A hardware-based cryptographic accelerator comprising:
   a normalization module configured to generate a normalized data block from a received unnormalized data block containing unnormalized data, wherein the unnormalized data block has a first number of unnormalized sub-blocks and the normalized data block has a second number of normalized sub-blocks, the normalization module further configured to:
  map bits in the unnnormalized data to the normalized data block such that a leading one in the unnormalized data is located at a most significant bit position in the normalized data block, by writing data in the unnormalized data block into the normalized data block in an unnormalized sub-block by unnormalized sub-block basis, starting with a least significant sub-block, wherein a least significant bit in the least significant sub-block of the unnormalized data block is written to an Xth position within an Nth sub-block of the normalized data block, wherein the Xth position is determined based on a number of bits following the leading one in a sub-block of the unnormalized data containing the leading one; and
  identify a bit position of the leading one in the unnormalized data;
a context module coupled to the normalization module configured to store the data identifying the bit position of the leading one in the unnormalized data; and
a cryptographic processing unit configured to perform cryptographic processing on the normalized data block to produce a normalized processed data block.

9. The hardware-based cryptographic accelerator of claim 8, further comprising:
a denormalization module configured to unnormalized the normalized processed data block using the data identifying the bit position of the leading one of the unnormalized data to generate an unnormalized processed data block.

10. The hardware-based cryptographic accelerator of claim 8, wherein:
  N is determined by (R-S-1) mod B, wherein R is the length of the unnormalized data divided by a number of bits per unnormalized sub-block, S is a length of data in the unnormalized data from the leading one bit to the least significant bit divided by the number of bits per unnormalized sub-block, and B is the number of bits per unnormalized sub-block.

11. The hardware-based cryptographic accelerator of claim 8, wherein the first number of sub-blocks in the unnormalized data block is the same as the third number of sub-blocks in the normalized data block.

12. The hardware-based cryptographic accelerator of claim 10, wherein the number of bits in an unnormalized sub-block is the same as a number of bits in a normalized sub-block.

13. The hardware-based cryptographic accelerator of claim 8, wherein the normalization module is further configured to:
  determine a shift amount; and
  for each unnormalized sub-block being written, shifting data in the unnormalized sub-block by the shift amount.

14. The hardware-based cryptographic accelerator of claim 13, wherein the shift amount is determined according to M mod B, wherein M is a length of data in the unnormalized data from the leading one bit to the least significant bit and B is a number of bits per unnormalized sub-block.

* * * * *

UNITED STATES PATENT AND TRADEMARK OFFICE
CERTIFICATE OF CORRECTION

| | | |
|---|---|---|
| PATENT NO. | : 8,086,870 B2 | Page 1 of 1 |
| APPLICATION NO. | : 11/450383 | |
| DATED | : December 27, 2011 | |
| INVENTOR(S) | : Law | |

It is certified that error appears in the above-identified patent and that said Letters Patent is hereby corrected as shown below:

In column 11, line 4, "unnnormalized" should be replaced with --unnormalized--.

In column 11, line 29, "unnnormalized" should be replaced with --unnormalize--.

Signed and Sealed this
Twenty-eighth Day of February, 2012

David J. Kappos
*Director of the United States Patent and Trademark Office*